United States Patent [19]

Held

[11] 4,285,525
[45] Aug. 25, 1981

[54] PRESSURE CUSHION SEAL FOR LAMINATING MACHINE

[76] Inventor: Kurt Held, Alte Strasse 1, D-7218 Trossingen 2, Fed. Rep. of Germany

[21] Appl. No.: 123,925

[22] Filed: Feb. 22, 1980

[30] Foreign Application Priority Data

Feb. 23, 1979 [DE] Fed. Rep. of Germany ....... 2907087

[51] Int. Cl.³ .......................... F16J 15/24; B30B 5/06
[52] U.S. Cl. ................................ 277/12; 277/DIG. 7;
277/188 R; 277/166; 100/93 RP; 100/154;
156/582
[58] Field of Search .................... 277/DIG. 7, 12, 152,
277/58, 153, 165, 125, 166, 188 A, 180, 188 R,
189, 237 R; 100/93 RP, 151, 154, 155 R;
162/371; 156/582

[56] References Cited

U.S. PATENT DOCUMENTS

| 2,135,763 | 11/1938 | Nicholson ........................ 100/151 X |
| 2,747,954 | 5/1956 | Damm et al. ................. 277/188 A X |
| 2,797,971 | 7/1957 | Greenough .................. 277/188 A X |
| 3,722,374 | 5/1973 | Densmore ................. 277/DIG. 7 X |
| 3,840,420 | 10/1974 | Sarcia ........................... 100/93 RP X |
| 3,907,310 | 9/1975 | Dufour ................................... 277/92 |
| 4,114,906 | 9/1978 | Jelinek ............................ 277/180 X |
| 4,193,342 | 3/1980 | Held ........................... 100/93 RP X |
| 4,221,390 | 9/1980 | Bainbridge ................ 277/DIG. 7 X |

FOREIGN PATENT DOCUMENTS

| 565010 | 11/1932 | Fed. Rep. of Germany ...... 277/188 R |
| 883078 | 7/1953 | Fed. Rep. of Germany ........... 277/189 |
| 2722197 | 6/1979 | Fed. Rep. of Germany . |

*Primary Examiner*—Robert S. Ward, Jr.
*Attorney, Agent, or Firm*—Spencer & Kaye

[57] ABSTRACT

A slide surface seal for laterally sealing a pressure cushion formed between a pressure plate and a metal belt advancing parallel to the plate in a moving belt laminating machine operating according to the pressure cushion principle, the seal being arranged to be mounted in a groove formed in the pressure plate and to bear against the metal belt to laterally surround the pressure cushion and to establish a fluid seal between the plate and the belt and the seal being composed of a seal mount of rigid material arranged to be inserted in the groove, at least one sealing strip secured to the mount and arranged to bear against the belt for maintaining a gap of minimum width between the seal and the belt, and an elastic sealing member secured to the mount adjacent the side of the sealing strip directed toward the interior of the pressure cushion and arranged to bear against the belt for maintaining losses of pressure medium from the cushion at a minimum.

5 Claims, 3 Drawing Figures

FIG. 2
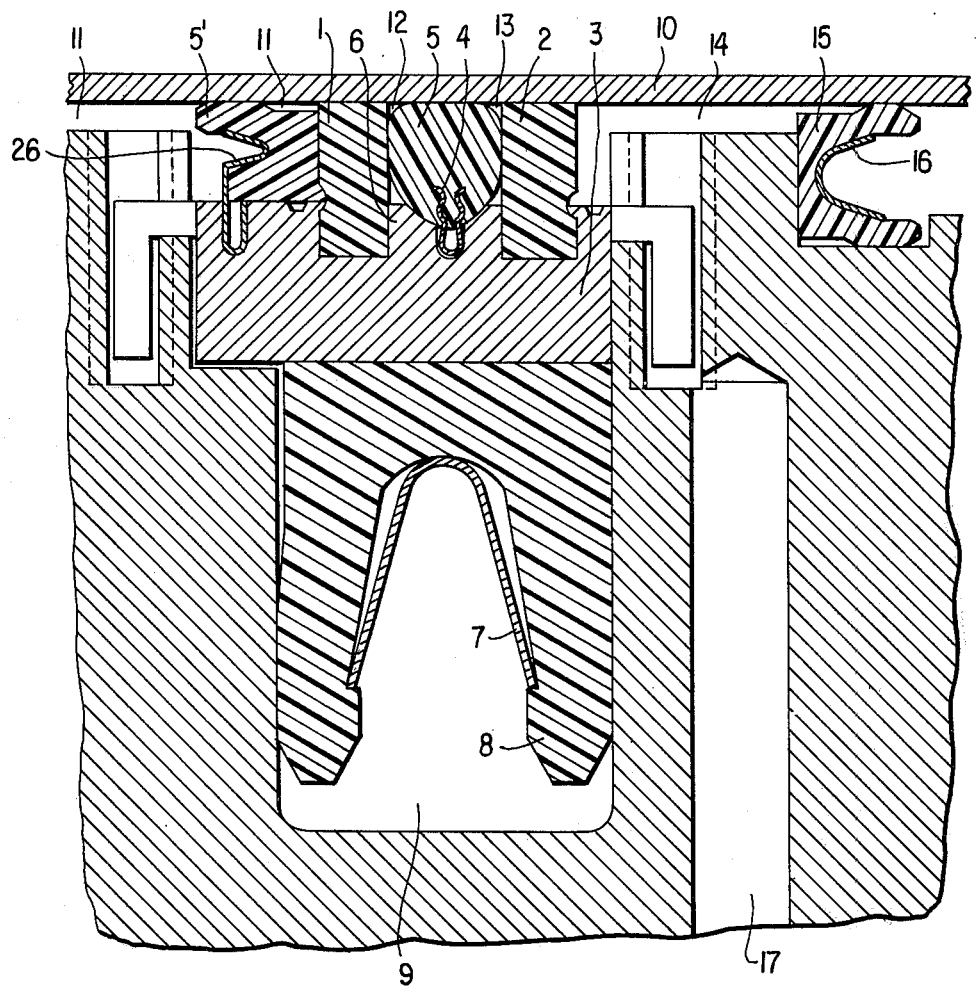
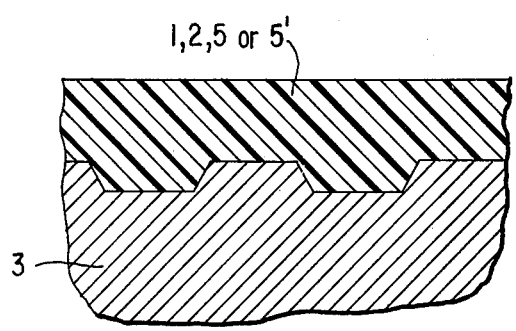
FIG. 3

PRESSURE CUSHION SEAL FOR LAMINATING MACHINE

BACKGROUND OF THE INVENTION

The present invention relates to seals for the pressure cushion of a laminating machine operating according to the pressure cushion principle.

Machines such as double belt presses perform laminating and compression procedures in which a strip of material to be compressed is fed between two traveling metal belts which press against opposite surfaces of the material in order to compress it. Such presses are composed essentially of two metal belts each mounted on a respective support structure and between which a compression region is formed. The belts are advanced around their respective support structures so as to convey the material being worked upon through the press as that material is being pressed.

One known type of double belt press is constructed to operate according to the pressure cushion principle. For this purpose, the support structure associated with each belt is provided with a pressure plate located behind the belt in the compression region and provided with a slide surface seal forming a frame which encloses a pressure cushion formed by a liquid of gaseous pressure medium. The major faces of the cushion are bounded by the surface of the pressure plate and the rear surface of the associated metal belt, and the slide surface seal cooperates with the pressure plate and the rear belt surface in order to seal the region containing the pressure medium. The pressure medium acts against the rear surface of the associated metal belt to press it against the work material.

Due to the frictional engagement between the metal belt, which is generally of steel, and the slide surface seal, the latter is subjected to a substantial degree of wear and thermal stresses. As a result, the strips forming such seals can be manufactured of only a few existing materials which are all relatively hard and unyielding. However, because of inherent limitations in the processes employed for manufacturing the steel belts, and the operating conditions to which those belts are subjected, the rear side of such a belt which contacts the slide surface seal cannot maintain a perfectly planar, smooth surface configuration where it contacts the seal. Therefore, in view of the relatively hard nature of known seal materials, there is a tendency for more than an acceptable amount of pressure medium to be lost from the pressure cushion by leakage past the seal thereof, and this will adversely influence the performance of the laminating machine and its economy of operation.

The use of a liquid pressure medium for the pressure cushion, while it is inherently desirable, becomes unacceptable when even small quantities of fluid are able to leak past the seal and accumulate in a region outside of the pressure cushion, although a minimum amount of leakage would be advantageous for lubrication purposes to increase the service life of the sealing strips.

Typical of the state of the art in this area are the disclosures of German Patent No. 2,722,197 and U.S. Pat. No. 2,135,763 which present, however, no detailed teachings regarding the configurations of the sealing strips, or packings, disclosed therein. In particular, these reference provide no indication as to how to deal with the unavoidable wear experienced by such sealing strips or the resulting formation of gaps during operation of the machine. Generally, the bearing and gap equalization function performed by slide surface seals cannot be taken over by elastic sealing components of the type customarily used in other areas of the hydraulic art without also introducing special measures to minimize gap formation.

SUMMARY OF THE INVENTION

Therefore, objects of the present invention are to provide a novel seal structure which overcomes the drawbacks of known structures and which, in particular, limits gap leakage losses to the level desired to effect lubrication of the sealing surfaces and makes it possible to collect fluid which does leak past the seal so as to prevent that fluid from causing malfunctions during operation of the machine.

These and other objects are achieved, according to the present invention, by the provision of a slide surface seal for laterally sealing a pressure cushion formed between a pressure plate and a metal belt advancing parallel to the plate in a moving belt laminating machine operating according to the pressure cushion principle, the seal being arranged to be mounted in a groove formed in the pressure plate and to bear against the metal belt to laterally surround the pressure cushion and to establish a fluid seal between the plate and the belt and the seal being composed of a seal mount of rigid material arranged to be inserted in the groove, at least one sealing strip secured to the mount and arranged to bear against the belt for maintaining a gap of minimum width between the seal and the belt, and an elastic sealing member secured to the mount adjacent the side of the sealing strip directed toward the interior of the pressure cushion and arranged to bear against the belt for maintaining losses of pressure medium from the cushion at a minimum.

BRIEF DESCRIPTION OF THE DRAWINGS

FIGS. 1 and 2 are cross-sectional, detail views of a peripheral region of a pressure plate provided with preferred embodiments of a seal according to the present invention.

FIG. 3 is a cross-sectional detail view of a modified form of construction for the embodiments of FIGS. 1 and 2.

DESCRIPTION OF THE PREFERRED EMBODIMENTS

Figure 1:
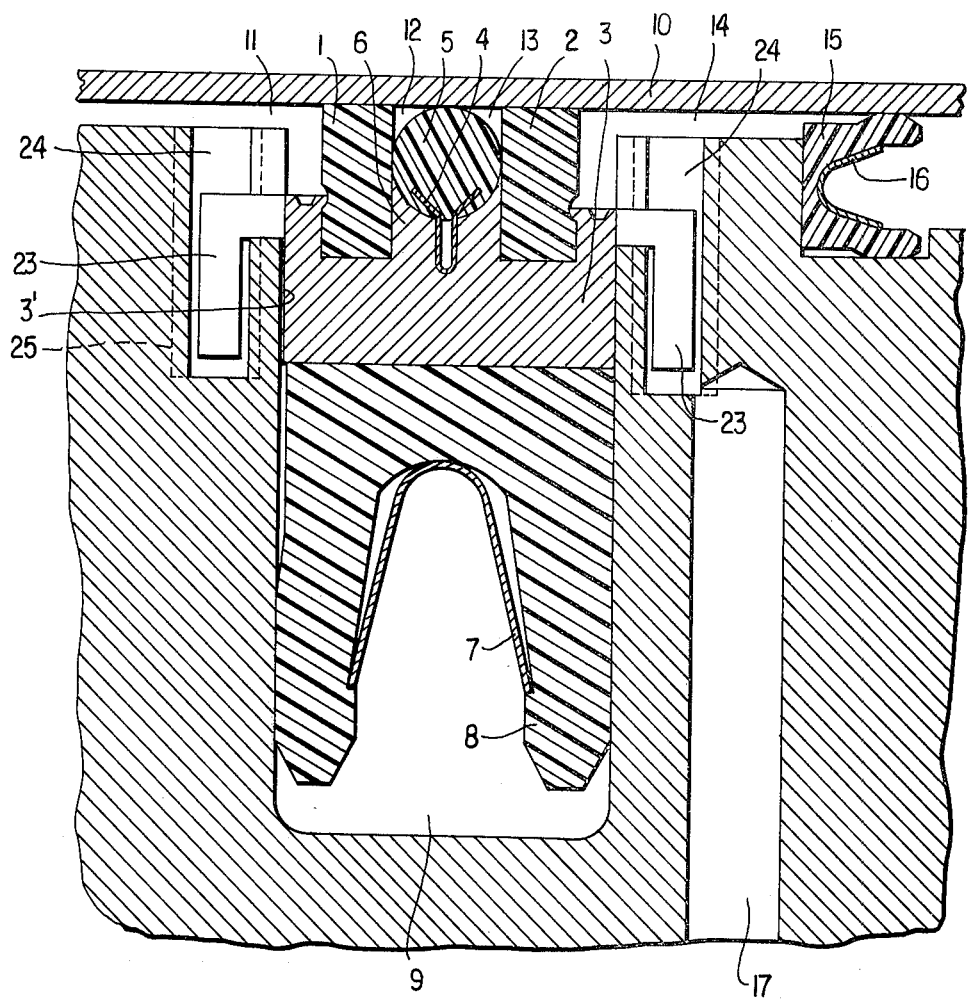

Each of FIGS. 1 and 2 illustrates, in cross section, a portion of a pressure plate, taken along a plane perpendicular to the cooperating surface of an associated steel belt 10 and in the region of a lateral boundary of the pressure cushion 11 formed between the pressure plate and the rear surface of the steel belt 10. In each embodiment, there is provided a groove 9 which extends, in the form of a frame, usually of rectangular form, around the periphery of the pressure cushion and a seal is inserted into groove 9 to also extend around the entire periphery of the pressure cushion, the seal itself delimiting the lateral boundary of that cushion.

In the embodiment shown in FIG. 1, the seal is composed of a mount 3 which is of a rigid material, such as metal, held in position in groove 9 by means of a series of L-shaped arms rigidly secured to mount 3 and seated in recesses 24 formed in the upper surface of the pressure plate along each side of groove 9. Arms 23 can be individual components spaced apart the length of mount 3, so that recesses 24 can be in the form of individual bores, rather than continuous grooves.

Mount 3 supports two sealing strips 1 and 2 which extend around the entire periphery of the pressure cushion and are spaced apart laterally of the pressure cushion to define a groove therebetween. The bottom of this groove is defined by a portion of mount 3 and this mount portion is provided with a slot 6 having parallel side walls and terminating in a bottom of generally semicylindrical configuration. Slot 6 may extend continuously around the entire periphery of the pressure cushion, or can be discontinuous, i.e. composed of individual sections spaced apart around the pressure cushion periphery.

The groove formed between sealing strips 1 and 2 accommodates a sealing member 5 which is made of a suitable soft, elastic material, such as an appropriate elastomer, together with a metal web 4 embedded in sealing member 5, as by being vulcanized therein. The portion of metal web 4 which protrudes from sealing member 5 is configured to conform to slot 6 and is firmly clamped therein to prevent movement of the elastic sealing member in response to friction forces imposed thereon by the moving steel belt 10.

The sealing member 5 is illustrated as having the form of an O-ring, but may also have other configurations. For example, member 5 could be in the form of a sealing lip which is pressed against steel belt 10 by an elastic reinforcement member or by the action of the pressure medium itself, as will be described below with reference to sealing member 5' of the embodiment shown in FIG. 2.

As is also shown in FIG. 1, the seal illustrated therein is further provided with a lip seal 8 which is located below mount 3 and is fitted into groove 9. Seal 8 is urged against the lateral walls of groove 9 by a spreader spring 7. Mount 3 is dimensioned to provide a narrow gap between its inner lateral wall 3' and the surface of groove 9 adjacent thereto in order to permit pressure medium in cushion 11 to flow into the region of groove 9 below seal 8. This flow occurs via the inner recesses 24, the above-mentioned gap between mount 3 and the associated lateral wall of groove 9, and past the inner leg of seal 8, which can be laterally deflected by the medium pressure in opposition to the biasing force of spring 7. Such pressure medium flow will occur until the pressure in the lower portion of groove 9 reaches a value somewhat below that in the pressure cushion 11, and the pressure thus created in the lower portion of groove 9 serves to press the seal mount 3 and the components 1, 2 and 5 carried thereby against the facing surface of moving belt 10.

As a result, the sealing member 5 bears against belt 10 to hermetically seal pressure cushion 11, or gap 12 at the low pressure side of strip 1, in order to prevent all but slight leakage losses.

Pressure fluid flowing past sealing member 5 into region 13, and from there past strip 2 into region 14, for example due to local irregularities in the contacting surface of belt 10, will be retained by a lip seal 16 located outside of the pressure cushion region and extending around the entire periphery thereof. Lip seal 16 is seated in a groove formed in the pressure plate and extending around the periphery of the pressure cushion and is pressed against the steel belt 10 by a spreader spring 16.

In order to remove any fluid which reaches region 14, this region is subjected to a vacuum pressure level applied via a bore 17 extending through the pressure plate, and recesses 24 extending between region 14 and bore 17. The resulting creation of a pressure below atmospheric in region 14 enables the atmospheric pressure in the region outside of seal 15 to assist in pressing that seal against both the associated surface of steel belt 10 and the base of its associated groove.

The embodiment illustrated in FIG. 2 is particularly adapted for a pressure cushion utilizing a gaseous medium and differs from that of FIG. 1 by the provision of a second elastic sealing member 5' located at the pressure cushion side of sealing strip 1. Sealing member 5' has the form of a conventional lip seal and is held in place, and urged against steel belt 10, by a spring member 26 which is clamped into a further slot provided in mount 3. Because of the configuration of sealing member 5' it is additionally pressed against steel belt 10 by the pressure medium in pressure cushion 11. Sealing member 5' is further held in place by engagement in a recess formed in the lateral wall of sealing strip 1 which faces member 5'. Sealing strip 5' could have configurations other than that illustrated, such as, for example, the form of an O-ring, corresponding to that illustrated for sealing member 5. Conversely, sealing member 5 can have configurations other than that illustrated, and could, for example, have the sealing lip form illustrated for sealing member 5'.

When, during use, the sealing strip 1 is subjected to wear, the resulting compression of sealing member 5' will displace its sealing surface somewhat in the direction toward the interior of the pressure cushion 11 without, however, causing it to lose its sealing effectiveness.

Fastening spring 26 may be secured to sealing member 5', as by vulcanization, and this spring, as well as fastening member 4 serve to hold their associated sealing members in position in order to assure transmission of friction forces imposed on those members to the seal mount 3, and from there into the pressure plate and the stationary components of the laminating machine. This result could also be achieved by giving one or both of the sealing members 5 and 5', as well as the sealing strips 1 and 2, and the associated surfaces of mount 3, an undercut, e.g. toothed, configuration.

One embodiment of such configuration is shown in FIG. 3 where mount 3 is given, at the surface thereof, or in one of the grooves provided for receiving sealing members 1, 2 and 5, a toothed configuration with which the associated sealing strip 1 or 2 or the associated sealing member 5 or 5' is placed into engagement either by being appropriately preshaped, as would be the case for strips 1 or 2, or by undergoing elastic deformation, as in the case of members 5 and 5'. This configuration would normally be provided along those sides of the pressure cushion which extend in the direction of belt travel.

The use of these seal structures in continuously operating laminating machines, e.g. double belt presses, operating according to the pressure cushion principle, leads to a substantial reduction in the quantity of pressure medium which must be supplied to the associated pressure cushions. As a result, the total energy consumption by the machine can be reduced and/or the pressure levels generated in the cushion can be increased. In addition, the arrangements according to the invention permit recovery of pressure medium lost from the cushion due to leakage, and thereby prevent such leakage losses from impairing functioning of the machine, and enable that fluid to be recirculated to the pressure cushion.

These results are achieved primarily through the ability of the elastomer sealing members 5 and 5' to conform to any irregularities in the portions of the steel belt surface contacting those sealing members by the reduction in the leakage gap width associated therewith, and by the pressure differential between the two sides of the lip seal 15 which serves to prevent flow of pressure medium past that seal in the direction away from the pressure cushion.

It will be understood that the above description of the present invention is susceptible to various modifications, changes and adaptations, and the same are intended to be comprehended within the meaning and range of equivalents of the appended claims.

What is claimed is:

1. A slide surface seal for laterally sealing a pressure cushion formed between a pressure plate and a metal belt advancing parallel to the plate in a moving belt laminating machine operating according to the pressure cushion principle, said seal being arranged to be mounted in a groove formed in the pressure plate and to bear against the metal belt to laterally surround the pressure cushion and to establish a fluid seal therebetween the plate and the belt and said seal comprising: a seal mount of rigid material arranged to be inserted in the groove; at least one sealing strip secured to said mount and arranged to bear against the belt for maintaining a gap of minimum width between said seal and the belt; and an elastic sealing member secured to said mount adjacent the side of said sealing strip directed toward the interior of the pressure cushion and arranged to bear against the belt for maintaining losses of pressure medium from the cushion at a minimum.

2. An arrangement as defined in claim 1 wherein said mount is provided with a gap beneath said sealing member, and further comprising a metal connecting web vulcanized into said sealing member and clamped into said gap for securing said sealing member to said mount.

3. An arrangement as defined in claim 1 wherein said mount is provided with surface indentations contacting, and holding in place at least one of said sealing strip and sealing member.

4. An arrangement as defined in claim 1, 2 or 3 further comprising: a second sealing strip secured to said mount and extending adjacent said sealing member at the opposite side thereof from said first recited sealing strip and arranged to bear against the belt; a second elastic sealing member disposed adjacent the side of said second sealing strip directed toward the interior of the pressure cushion and arranged to bear against the belt to aid in maintaining losses of pressure medium from the cushion at a minimum.

5. An arrangement as defined in claim 1 in combination with a pressure plate arranged to face the belt and provided with a groove in which said mount is inserted and with a fluid evacuation passage communicating with a region above the surface of said plate arranged to face the belt and at the side of said sealing strip remote from the pressure cushion, and wherein said seal further comprises a lip sealing member mounted on said plate and arranged to bear against the belt at the side of said region remote from the pressure cushion for sealing said region against the external atmosphere, and said region is arranged to be at a vacuum pressure for evacuating pressure fluid flowing into said region from the pressure cushion.

* * * * *